United States Patent
Cheng et al.

(10) Patent No.: US 10,579,522 B2
(45) Date of Patent: Mar. 3, 2020

(54) METHOD AND DEVICE FOR ACCESSING A CACHE MEMORY

(71) Applicant: ANDES TECHNOLOGY CORPORATION, Hsin-Chu (TW)

(72) Inventors: Chieh-Jen Cheng, Kaohsiung (TW); Chuan-Hua Chang, Taipei (TW)

(73) Assignee: ANDES TECHNOLOGY CORPORATION, Hsinchu (TW)

( * ) Notice: Subject to any disclaimer, the term of this patent is extended or adjusted under 35 U.S.C. 154(b) by 739 days.

(21) Appl. No.: 15/263,383

(22) Filed: Sep. 13, 2016

(65) Prior Publication Data

US 2018/0074957 A1   Mar. 15, 2018

(51) Int. Cl.
| | |
|---|---|
| *G06F 12/00* | (2006.01) |
| *G06F 12/0802* | (2016.01) |
| *G06F 12/0862* | (2016.01) |
| *G06F 12/1027* | (2016.01) |

(52) U.S. Cl.
CPC ...... *G06F 12/0802* (2013.01); *G06F 12/0862* (2013.01); *G06F 12/1027* (2013.01); *G06F 2212/1016* (2013.01); *G06F 2212/152* (2013.01); *G06F 2212/507* (2013.01); *G06F 2212/6026* (2013.01)

(58) Field of Classification Search
None
See application file for complete search history.

(56) References Cited

U.S. PATENT DOCUMENTS

| | | | |
|---|---|---|---|
| 5,148,538 | A | 9/1992 | Celtruda et al. |
| 5,392,410 | A | 2/1995 | Liu |
| 5,956,752 | A | 9/1999 | Mathews |
| 6,138,215 | A | 10/2000 | Check et al. |
| 6,138,223 | A | 10/2000 | Check et al. |
| 6,745,313 | B2 | 6/2004 | Liptay et al. |
| 7,831,799 | B1 | 11/2010 | Belgard |

*Primary Examiner* — Midys Rojas
(74) *Attorney, Agent, or Firm* — JCIPRNET

(57) ABSTRACT

A method and a device for accessing a cache memory are provided. The method comprises: generating, by a bit prediction unit (BPU), a prediction bit corresponding to an instruction instructing to access the cache memory from a central processing unit (CPU); generating, by an instruction execution unit (IEU), a virtual address corresponding to the instruction; generating, by a load/store unit (LSU), a predicted cache index according to the prediction bit and a part of a virtual page offset of the virtual address; and reading, by the LSU, data from the cache memory by using the predicted cache index. Therefore, the maximum size of the cache memory could be increased.

20 Claims, 9 Drawing Sheets

METHOD AND DEVICE FOR ACCESSING A CACHE MEMORY

FIELD OF THE DISCLOSURE

The disclosure relates to a memory accessing technology. More particularly, the disclosure relates to a method and a device for accessing a cache memory.

DESCRIPTION OF RELATED ART

A central processing unit (CPU) cache is commonly used in a CPU of a computer. When CPU wants to access data from a main memory of the CPU, the CPU first checks whether the requested data is maintained at the CPU cache. If the requested data is maintained at the CPU cache, the requested data can be directly accessed from the CPU cache. If the requested data is not maintained at the CPU cache, the requested data will be loaded into the CPU cache from the main memory, and then be accessed from the CPU cache. However, the speed of accessing data from the CPU cache may be significantly faster than the speed of accessing data from the main memory.

FIG. 1A is a traditional cache accessing structure for a CPU. Referring to FIG. 1, a traditional cache accessing structure consists of an instruction execution unit (IEU) 11, a memory management unit (MMU) 12 and a load/store unit (LSU) 13. In the IEU 11, the arithmetic logic unit (ALU) 111 generates a virtual address according to an instruction instructing to access a cache memory 131 from a CPU and then stores the virtual address to a virtual address register 112. Then, the MMU 12 reading a translation lookaside buffer (TLB) 121 in order to translate the virtual address to a physical address and stores the physical address in the physical address register 122. Then, the LSU 13 gets a cache index from the physical address and uses the cache index to access the cache memory 131. Finally, a tag verification circuit 132 verifies the data read from the cache memory 131 based on a tag of the physical address. If the verification succeeds, the tag verification circuit 132 issues a "cache hit" message and the data read from the cache memory 131 is transmitted to the CPU. If the verification fails, the tag verification circuit 132 issues a "cache miss" message and the data read from the cache memory 131 is discarded. It is noted that, in the structure of FIG. 1A, the accessing of the cache memory 131 is performed after the physical address is generated by the MMU 12 since the cache index for accessing the cache memory 131 is obtained from the physical address generated by the MMU 12. Therefore, the efficiency of accessing cache memory is decreased. As an improvement, a modified cache accessing structure is proposed.

FIG. 1B is a modified cache accessing structure for a CPU. In the modified cache accessing structure as shown in FIG. 1B, after the virtual address is obtained by the IEU 11, a cache accessing operation by the LSU 13 and an address translating operation by the MMU 12 can be performed simultaneously. Namely, in the cache accessing operation performed by the LSU 13, a cache index is directly obtained from the virtual address (i.e., obtained from a virtual page offset of the virtual address) and is immediately used for accessing the cache memory 131 while the MMU 12 performs the address translating operation for translating the virtual address to the physical address at the same time. Comparing with the structure of FIG. 1A, since the cache accessing operation can be performed simply based on the virtual address without waiting for the address translating operation, a cache accessing efficiency can be improved.

And, the maximum size of cache memory supported by the structure of FIG. 1B is limited.

However, with the capacity of the cache memory increasing, the cache index may now include at least one bit which is included in a specific part of the physical address that is translated from the virtual address. As a result, the structures of FIG. 1A is unsuitable for usage in efficiency. The structure of FIG. 1B is unsuitable for usage in capacity.

SUMMARY OF THE DISCLOSURE

The disclosure is directed to a method and a device for accessing a cache memory, which are capable of improving the data accessing efficiency of the cache memory.

In an embodiment of the disclosure, a method for accessing a cache memory is provided. The method comprises: generating, by a bit prediction unit (BPU), a prediction bit corresponding to an instruction instructing to access the cache memory from a central processing unit (CPU); generating, by an instruction execution unit (IEU), a virtual address corresponding to the instruction; generating, by a load/store unit (LSU), a predicted cache index according to the prediction bit and a part of a virtual page offset of the virtual address; and reading, by the LSU, data from the cache memory by using the predicted cache index.

In another embodiment of the disclosure, a device for accessing a cache memory is provided. The device includes a BPU, an IEU and a LSU. The BPU is configured to generate a prediction bit corresponding to an instruction instructing to access the cache memory from a CPU. The IEU is coupled to the BPU and configured to generate a virtual address corresponding to the instruction. The LSU is coupled to the BPU and configured to generate a predicted cache index according to the prediction bit and a part of a virtual page offset of the virtual address, wherein the LSU is further configured to read data from the cache memory by using the predicted cache index.

In view of the above, after an instruction instructing to access a cache memory is received from a CPU, a virtual address and one or more prediction bits corresponding to the instruction are generated. Then, a predicted cache index is generated according to the prediction bit and a part of a virtual page offset of the virtual address and is further used for reading data from the cache memory. Therefore, the maximum size of the cache memory could be increased.

Several exemplary embodiments accompanied with figures are described in detail below to further describe the disclosure in details.

DETAILED DESCRIPTION OF DISCLOSED EMBODIMENTS

Figure 1A:
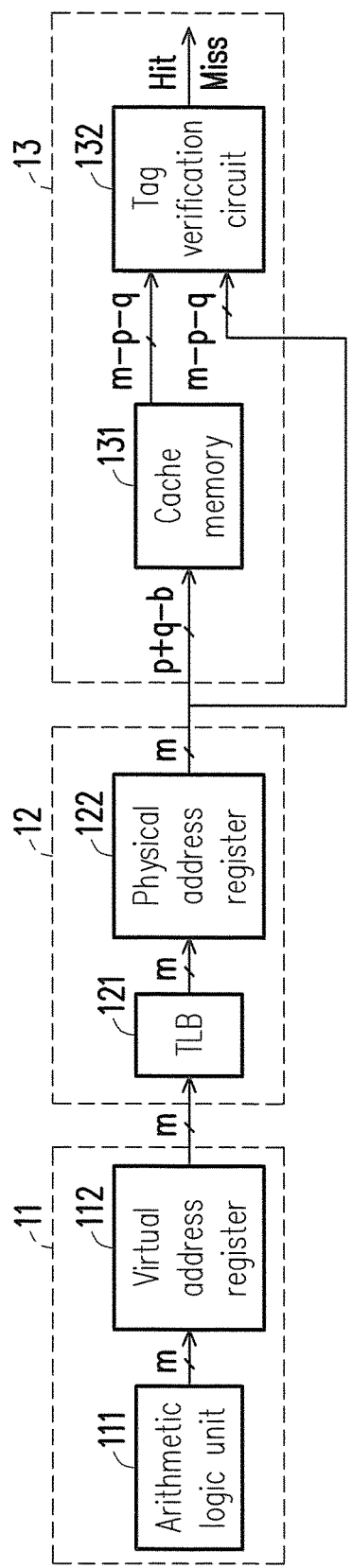
FIG. 1A is a traditional cache accessing structure for a CPU.

Reference will now be made in detail to the present preferred embodiments of the disclosure, examples of which are illustrated in the accompanying drawings. Wherever possible, the same reference numbers are used in the drawings and the description to refer to the same or like parts.

Embodiments of the present disclosure may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Figure 2:
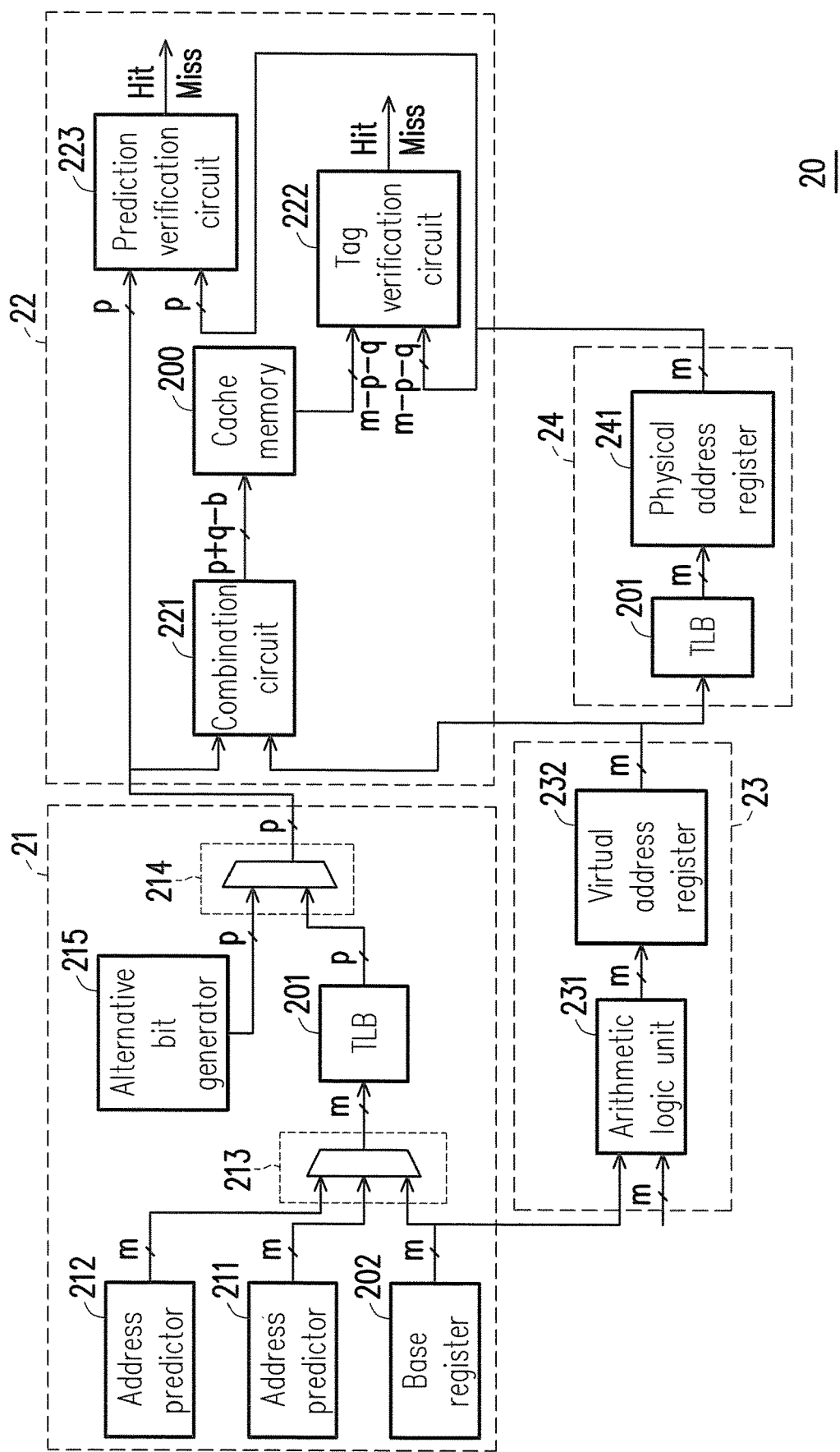
FIG. 2 is a schematic view illustrating a device for accessing a cache memory according to an embodiment of the disclosure.

FIG. 2 is a schematic view illustrating a device for accessing a cache memory according to an embodiment of the disclosure.

Referring to FIG. 2, the device 20, for accessing a cache memory 200, includes bit prediction unit (BPU) 21, a load/store unit (LSU) 22, an instruction execution unit (IEU) 23 and a memory management unit (MMU) 24. The BPU 21 is configured to generate a prediction bit corresponding to an instruction instructing to access the cache memory 200. For example, the instruction is issued by a central processing unit (CPU). For example, the device 20, the cache memory 200 and the CPU is disposed on one chip or one circuit board. The IEU 23 is coupled to the BPU 21 and the MMU 24 and is configured to generate a virtual address corresponding to the instruction. The LSU 22 is coupled to the BPU 21 and the MMU 24 and is configured to generate a predicted cache index according to the prediction bit and a part of a virtual page offset of the virtual address. The LSU 22 is further configured to read data from the cache memory 200 by using the predicted cache index. In addition, the MMU 24 is configured to translate the virtual address to a physical address.

Figure 3:
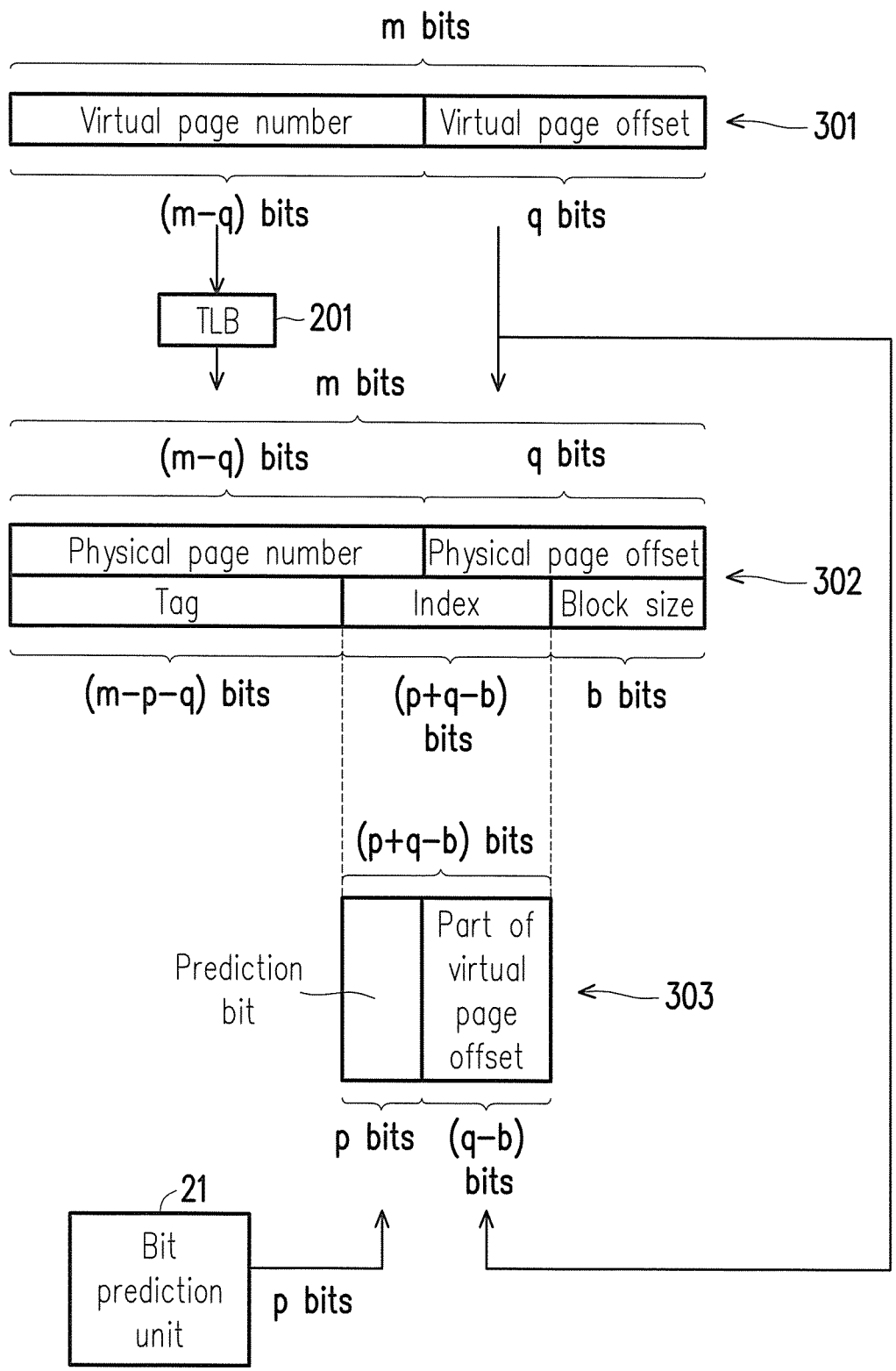
FIG. 3 is a schematic view illustrating a virtual address, a physical address and a predicted cache index according to an embodiment of the disclosure.

FIG. 3 is a schematic view illustrating a virtual address, a physical address and a predicted cache index according to an embodiment of the disclosure.

Referring to FIG. 2 and FIG. 3, the virtual address 301 is used by a CPU (e.g., by an application of the CPU) for loading data from the cache memory 200 or storing data into the cache memory 200. The virtual address 301 includes a first part which is also referred to as a virtual page number and a second part which is also referred to as a virtual page offset, where the virtual address 301 includes m bits, the virtual page number includes (m−q) bits and the virtual page offset includes q bits. The virtual address 301 can be translated to a physical address 302 through reading a translation lookaside buffer (TLB) 201, where the physical address 302 includes m bits. In the present embodiment, the address translation operation for translating the virtual address 301 to the physical address 302 is performed by the MMU 24.

In the present embodiment, the physical address 302 may be considered as conforming to two kinds of data structure. In the perspective of MMU 24, the physical address 302 includes a first part which is also referred to as a physical page number and a second part which is also referred to as a physical page offset, where the physical page number includes (m−q) bits and the physical page offset includes q bits. It is noted that, in fact, only the (m−q) bits of the virtual page number is translated by the TLB 201 in order to generate the (m−q) bits of the corresponding physical page number, while the physical page offset may be obtained through copying the virtual page offset.

In another perspective of cache (or the LSU 22), the physical address 302 includes a first part which is also referred to as a tag, a second part which is also referred to as an index (e.g., the cache index for accessing the cache memory 200), and a third part which is also referred to as a block size, where the tag includes (m−p−q) bits, the index includes (p+q−b) bits, and the block size includes b bits. In some case, the (q−b) bits of the index can represent all addresses of a cache memory (i.e., p=0 and the index is fully included in the virtual page offset or the physical page offset), so the index can be directly obtained from the virtual page offset of the virtual page 301 or the physical page offset of the physical address 302.

However, in the present embodiment, the (q−b) bits of the index is not enough for representing all addresses of the cache memory 200, so the index is expanded to includes (p+q−b) bits, where p is a positive integer, such as 1, 2 or 3, and the p bit(s) is a part of the physical page number of the physical page 302. Therefore, if the LSU 22 intends to access the cache memory 200 before the "actual" physical address 302 is completely generated by the MMU 24, an index 303 (which is also referred to as a predicted cache index thereafter), having a data length of (p+q−b) bits where p is a positive integer, is predicted first with reference to the virtual address 301 in order to access the cache memory 200.

As shown in FIG. 3, the predicted cache index 303 includes a first part which is also referred to as a prediction bit and a second part which is a part of the virtual page offset of the virtual address 301. In the present embodiment, the p bit(s) of the prediction bit is provided by the BPU 21, while the second part of the predicted cache index 303 is obtained from the virtual page offset of the virtual address 301 by the LSU 22.

Referring back to FIG. 2, the BPU 21 includes an address predictor 211, an address predictor 212, a multiplexer 213, a multiplexer 214 and an alternative bit generator 215. When receiving an instruction instructing to access the cache memory 200, the BPU 21 first generates a predicted virtual address corresponding to the instruction. For example, in response to the instruction, the predicted virtual address may be read from the address predictor 211, address predictor 212 or a base register 202, where a register number of the base register 202 is indicated by the instruction, and the predicted virtual address is output by the multiplexer 213. The data length of the predicted virtual address is m bits.

After obtaining the predicted virtual address, the BPU 21 reads the TLB 201 according to the predicted virtual address and determining whether a first prediction bit is obtained by reading the TLB 201. For example, if a mapping relationship between the predicted virtual address (or a virtual page number of the predicted virtual address) and a physical address (or a physical page number of the physical address)

is recorded in the TLB 201 (i.e., TLB hit), the first prediction bit can be obtained from the read result (e.g., obtained from the physical page number of the found physical address).

However, if the mapping relationship between the predicted virtual address (or the virtual page number of the predicted virtual address) and the corresponding physical address (or the physical page number of the physical address) is not recorded in the TLB 201 (i.e., TLB miss), it means the first prediction bit cannot be obtained by reading the TLB 201, such that a second prediction bit is provided by the alternative 215. For example, each of the first prediction bit and the second prediction bit includes p bit(s). The multiplexer 214 generates the prediction bit according to the received first prediction bit from the TLB 201 or the received second prediction bit from the alternative bit generator 215.

The IEU 23 includes an arithmetic logic unit (ALU) 231 and a virtual address register 232, where the virtual address register 232 coupled to the ALU 231. In response to the instruction from the CPU, the ALU 231 receives a base address from the base register 202 and an offset value indicated by the instruction and generates a virtual address corresponding to the instruction through adding the base address to the offset value. The generated virtual address is then stored by the virtual address register 232.

After the prediction bit and the virtual address are generated, the LSU 22 receives the prediction bit from the BPU 21 and the MMU 24 receives the virtual address from the IEU 23. The LSU 22 performs a cache accessing operation while the MMU 24 performs an address translation operation simultaneously. To be specific, the LSU 22 includes a combination circuit 221, a tag verification circuit 222 and a prediction verification circuit 223. In the cache accessing operation, the combination circuit 221 receives the prediction bit (e.g., the first part of the predicted cache index 303) from the BPU 21 (e.g., from the multiplexer 214) and receives a part of the virtual page offset of the virtual address (e.g., the second part of the predicted cache index 303) from the IEU 23 (e.g., from the virtual address register 232). The combination circuit 221 combines the prediction bit and the part of the virtual page offset and accordingly generates a predicted cache index (e.g., the predicted cache index 303). Then, the LSU 22 uses the predicted cache index to read data and a physical tag from the cache memory 200.

It is noted that, the cache accessing operation and the address translation operation can be performed simultaneously. In the address translation operation, the MMU 24 reads the TLB 201 by using the virtual address (or the virtual page number of the virtual address) received from the IEU 23 and accordingly translates the virtual address to a physical address. The obtained physical address is then stored by a physical address register 241.

Furthermore, in order to verify whether the data read from the cache memory 200 is the "actual" data requested by the instruction, the tag verification circuit 222 performs a tag verification operation and the prediction verification circuit 223 performs a prediction verification operation. In the tag verification operation, the tag verification circuit 222 receives the physical tag read from the cache memory 200 and receives a specific tag of the physical address from the MMU 24 (e.g., from the physical address register 241). For example, the specific tag of physical address may be the tag of the physical address (e.g., the (m-p-q) bits of the tag of the physical address 302 as shown in FIG. 3). Then, the tag verification circuit 222 compares the physical tag with the specific tag and thereby determining whether the physical tag is identical to the specific tag. If it is determined that the physical tag is not identical to the specific tag (i.e., the tag verification operation fails), the tag verification circuit 222 issues a "cache miss" message and the data read from the cache memory 200 is discarded. In other words, "cache miss" means the desired data requested by the instruction is not currently in the cache memory 200. For example, in response to the "cache miss" message, the CPU issues a request to a next-level memory hierarchy for requesting the desired data which cannot be read from the cache memory 200.

On the other hand, in the prediction verification operation, the prediction verification circuit 223 receives the prediction bit from the BPU 21 (e.g., from the multiplexer 214) and receives a specific bit of the physical address from the MMU 24 (e.g., from the physical address register 241). For example, the specific bit of the physical address may be the p bit(s) belongs to both the physical page number and the cache index of the physical address 302 as shown in FIG. 3. Then, the prediction verification circuit 223 compares the prediction bit with the specific bit and thereby determining whether the prediction bit is identical to the specific bit. If it is determined that the prediction bit is not identical to the specific bit (i.e., the prediction verification operation fails), the prediction verification circuit 223 issues a "prediction miss" message and the data read from the cache memory 200 is discarded. For example, if the "prediction miss" message is issued, the LSU 22 further uses the "actual" cache index included in the physical address (e.g., the cache index of the physical address 302 as shown in FIG. 3) to access the cache memory 200 and transmits the read data to the CPU.

In other words, the prediction verification operation is for determining whether the prediction bit used for accessing the cache memory 200 is wrong (i.e., different from the specific bit of the "actual" cache index included in the translated physical address), while the tag verification operation is for determining whether the data read from the cache memory 200 based on the prediction bit is the "desired" data no matter whether the prediction verification operation succeeds or not. In another embodiment, the tag verification operation is performed only when the prediction verification operation succeeds.

However, if the prediction bit is identical to the specific bit of the physical address (i.e., the prediction verification operation succeeds) and the physical tag is identical to the specific tag in the physical address (i.e., the tag verification operation succeeds), the LSU 22 determines that the prediction bit predicted by the BPU 21 is correct and the read data is desired by the CPU and then transmits the data read from the cache memory 200 to the CPU. Accordingly, an operation for reading the requested data from a cache memory in response to one instruction received from the CPU is completed. Details of the bit prediction operation performed by the BPU 21 is described below.

In one embodiment, after receiving an instruction instructing to access the cache memory 200, the address predictor 211 first obtains a register number from the instruction and determines whether the register number hits a shadow register list. If the register number hits the shadow register list, the address predictor 211 generates the predicted virtual address by adding a base address corresponding to the register number with an offset value indicated by the instruction. Namely, in this case, the multiplexer 213 receives the predicted virtual address to be output from the address predictor 211.

Figure 4:
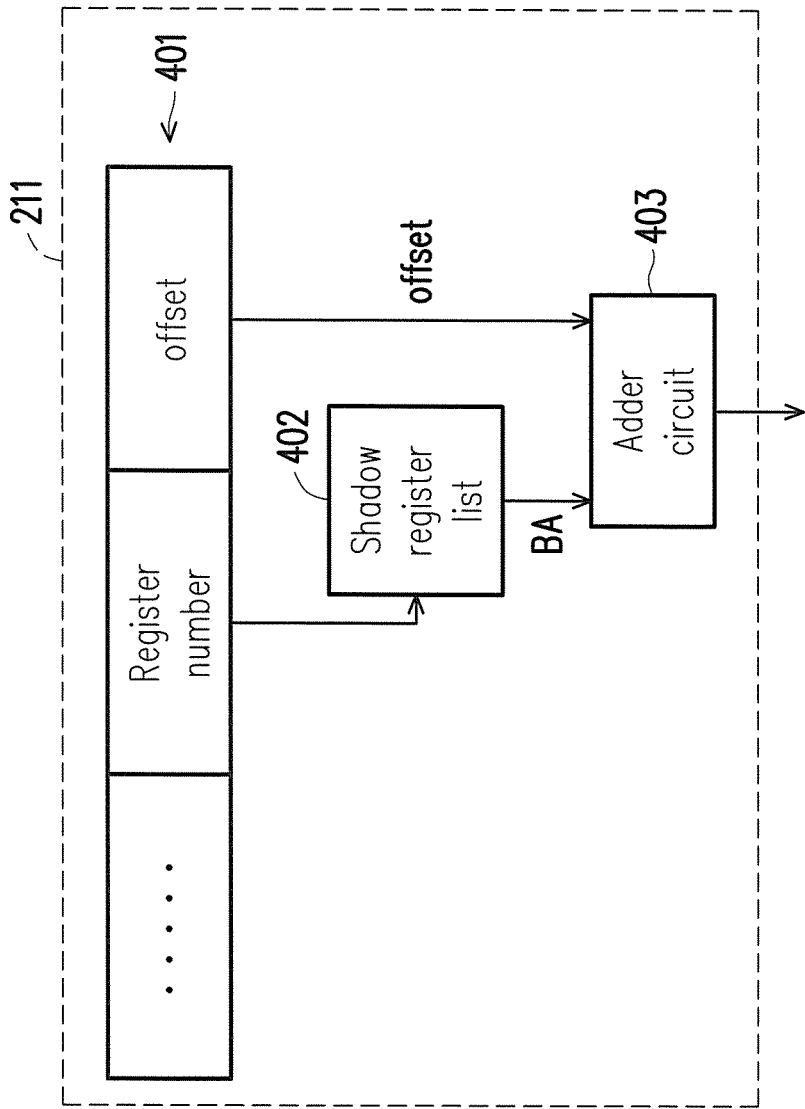
FIG. 4 is a schematic view illustrating an address predictor according to an embodiment of the disclosure.

FIG. 4 is a schematic view illustrating an address predictor according to an embodiment of the disclosure.

Referring to FIG. 4, the address predictor 211 includes a shadow register list 402 and an adder circuit 403. After receiving the instruction 401, the address predictor 211 obtains a register number and an offset (i.e., the offset value) from the instruction 401. The address predictor 211 reads the shadow register list 402 by using the register number and determines whether a corresponding base address BA is obtained. For example, if the base address BA is obtained by reading the shadow register list 402, it means the register number hits the shadow register list 402; if no corresponding base address is obtained by reading the shadow register list 402, it means the register number does not hit the shadow register list 402. If the register number hits the shadow register list 402, the adder circuit 403 adds the base address to the offset and accordingly generates the predicted virtual address.

Referring back to FIG. 2, if the register number does not hit the shadow register list, the address predictor 212 determines whether a program counter (or at least one bit of the program counter) corresponding to the instruction hits a reference prediction table. If the program counter (or the at least one bit of the program counter) hits the reference prediction table (e.g., a mapping relation between the program counter and a corresponding virtual address is recorded in the reference prediction table), the address predictor 212 generates the predicted virtual address according to the virtual address and the stride value both read from the reference prediction table. Namely, in this case, the multiplexer 213 receives the predicted virtual address to be output from the address predictor 212.

However, if both the address predictor 211 and address predictor 212 cannot provide the predicted virtual address, the base register 202 corresponding to the register number indicated by the instruction is located and a base address of the base register 202 is read and is served as the predicted virtual address. Namely, in this case, the multiplexer 213 receives the predicted virtual address to be output from the base register 202.

Figure 5:
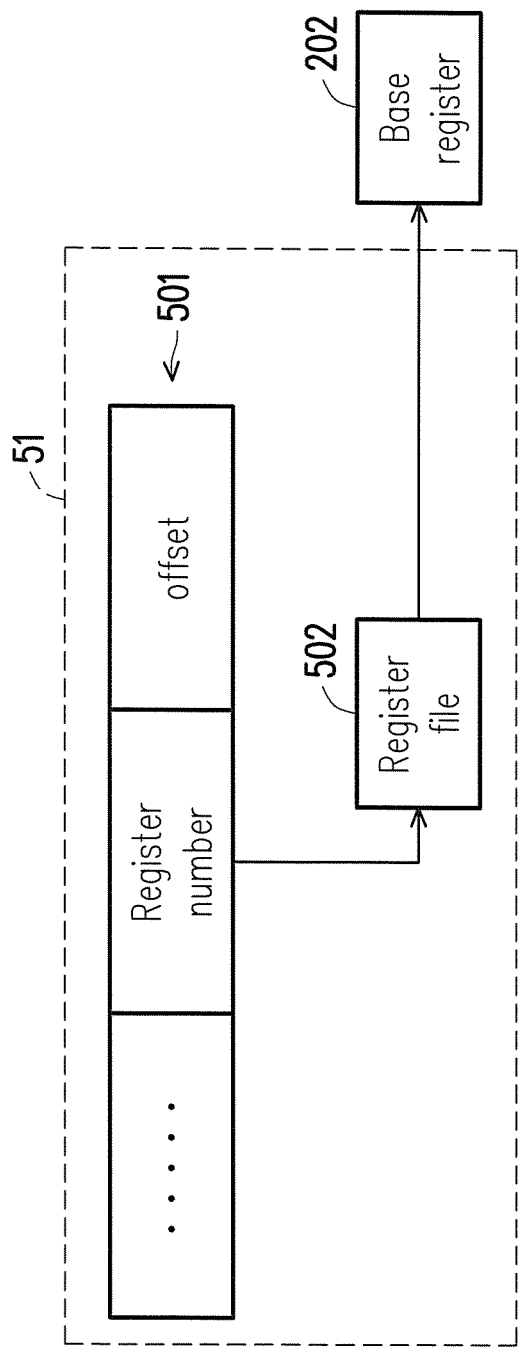
FIG. 5 is a schematic view illustrating a read operation of a base register according to an embodiment of the disclosure.

FIG. 5 is a schematic view illustrating a read operation of a base register according to an embodiment of the disclosure.

Referring to FIG. 5, in one embodiment, the BPU 21 further includes an operand fetch unit (OFU) 51. When the BPU 21 intends to obtain the predicted virtual address directly from the base address 202, the OFU 51 obtains the register number indicated by the instruction 501 and reads a register file 502 by using the register number. Through reading the register file 502, the base address of the base register 202 is obtained.

In the present embodiment, some of the base registers each recording a base address not frequently changed are recorded in the shadow register list of the address predictor 211. If a register number hits the shadow register list, the corresponding base address (e.g., the base address BA of FIG. 4) is added to the offset value indicated by the instruction and thereby generating the predicted virtual address. It is noted that, the operation of generating the predicted virtual address by the address predictor 211 is performed before the "real" virtual address is generated by the ALU 231. Furthermore, the predicted virtual address provided by the address predictor 211 may be the one closest to the "real" virtual address generated by the ALU 231.

However, if the address predictor 211 cannot provide the predicted virtual address, it means the base register is not one of the registers identified as storing a base address not frequently changed, so the address predictor 212 successively searches the reference prediction table and tries to generate the predicted virtual address, where the reference prediction table can be established by using any characteristic of an instruction or the memory accessed by the instruction. For example, the reference prediction table may record multiple stride values each corresponding to one virtual address, where each virtual address is indexed by a program counter. Before reading the reference prediction table, the address predictor 212 obtains a program counter corresponding to the instruction, where the program counter contains the memory address of the instruction. The address predictor 212 reads the reference prediction table by using at least one bit of the program counter as an index. If a mapping relationship between the program counter and a virtual address is recorded in the reference prediction table, the address predictor 212 obtains the virtual address and a stride value corresponding to the virtual address from the reference prediction table. For example, the virtual address may be a virtual address accessed by the same instruction previously. If the virtual address and the corresponding stride value are obtained, the address predictor 212 adds the stride value to the corresponding virtual address and generates the predicted virtual address. In some cases, an instruction may access multiple memory addresses successively, where the distance between any two successively accessed memory addresses is a constant stride value (e.g., offset). Accordingly, if address predictor 212 can obtain a virtual address and the corresponding stride value from the reference prediction table, and add them together to generate the predicted virtual address. The predicted virtual address provided by the address predictor 212 will have a higher probability to be the same as the virtual address generated by the ALU 231.

However, if the address predictor 212 still cannot provide the predicted virtual address, a remaining way is to read the base address of the base register 202, as shown in FIG. 5, and then use the base address directly as the predicted virtual address. Even the predicted virtual address is generated like this, there is still a higher probability to generate the correct prediction bit and thereby to read the requested data from the cache memory 200.

It is noted that, in another embodiment, the output of the base register 202 can be directly provided as the predicted virtual address and/or one of the address predictor 211 and the address predictor 212 may not be enabled. For example, in one embodiment, after the instruction is received from the CPU, the address predictor 212 can be directly enabled for providing the predicted virtual address without first enabling the address predictor 211. Alternatively, in one embodiment, after the instruction is received from the CPU, the base address of base register 202 can be directly read and used as the predicted virtual address without enabling the address predictor 211 and the address predictor 212. In this way, the predicted virtual address may be generated faster to reduce the latency.

Furthermore, in the bit prediction operation performed by the BPU 21, if a TLB miss event occurs in the BPU 21 (i.e., the mapping relationship between the predicted virtual address and the corresponding physical address is not recorded in the TLB 201), the multiplexer 214 switches to receive the second prediction bit from the alternative bit generator 215 in order to generate the prediction bit. The alternative bit generator 215 provides an alternative bit as the second prediction bit, where the alternative bit may be, for example, a constant value or a value from the physical memory address accessed by a previous load/store instruction. The previous load/store instruction may be, for example, a load/store instruction which is received and/or performed earlier than and closest to the current instruction. Alternatively, the previous load/store instruction may also be any instruction instructing to access the cache memory 200.

Furthermore, in one embodiment, the alternative bit generator 215 provides the alternative bit by reading a history table using a history table index corresponding to the instruction. For example, if the first prediction bit is not obtained by reading the TLB 201 and the second prediction bit is used as the prediction bit, then after the physical address is generated by the MMU 24, the alternative bit generator 215 updates the history table according to the physical address generated by the MMU 24.

Figure 6:
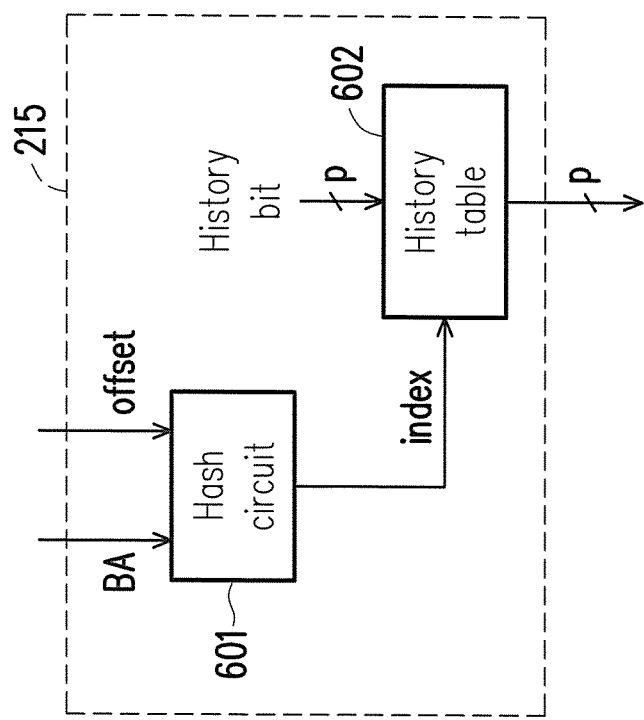
FIG. 6 is a schematic view illustrating an alternative bit generator according to an embodiment of the disclosure.

FIG. 6 is a schematic view illustrating an alternative bit generator according to an embodiment of the disclosure.

Referring to FIG. 6, the alternative bit generator 215 may include a hash circuit 601 and a history table 602. The hash circuit 601 receives the base address BA (e.g., the base address of the base register 202) corresponding to an instruction and the offset value indicated by the same instruction and performs a logical operation (e.g., a hash operation, such as XOR operation) on the base address BA and the offset value to generate the history table index. Then, a mapping relationship between the history table index and said specific bit (also referred to as a history bit as shown in FIG. 6) of the physical address generated by the MMU 24 is recorded in the history table. For example, the specific bit is the p bit(s) transmitted from the MMU 24 to the prediction verification circuit 223. Later, if another instruction instructing to access the cache memory 200 is received and a TLB miss occurs in the BPU 21 again, the hash circuit 601 may use the same base address BA corresponding to the another instruction and the offset value indicated by the another instruction to generate the history table index and then use the history table index to read the history table. As a result, the specific bit recorded previously can be obtained and be served as the second prediction bit and further be provided to the LSU 22 for generating the predicted cache index. Therefore, the successful rate for reading the request data from the cache memory 200 can be further improved.

Figure 7:
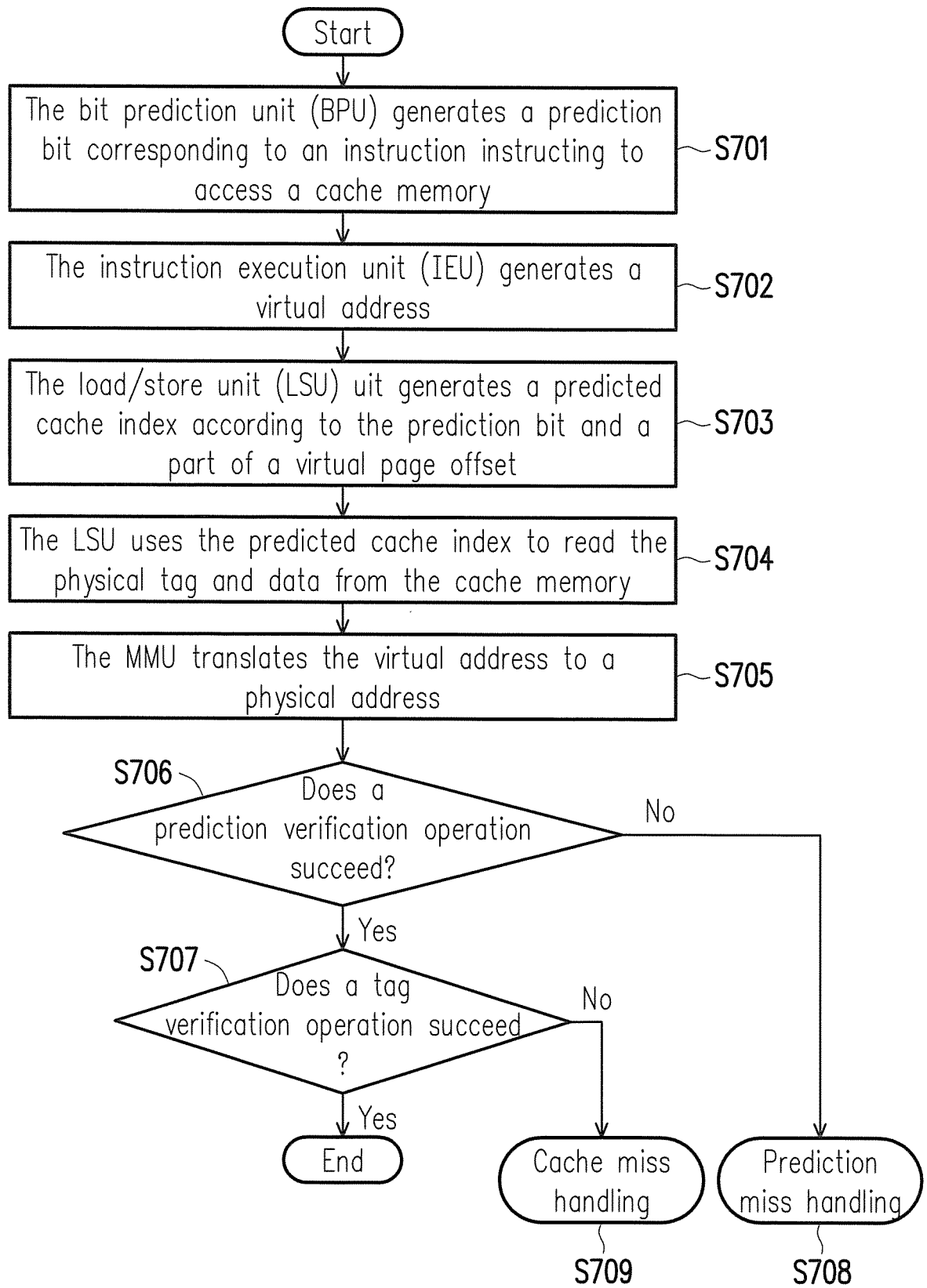
FIG. 7 is a flowchart of a method for accessing a cache memory according to an embodiment of the disclosure.

FIG. 7 is a flowchart of a method for accessing a cache memory according to an embodiment of the disclosure.

Referring to FIG. 2 and FIG. 7, in step S701, the bit prediction unit (BPU) 21 generates a prediction bit corresponding to an instruction instructing to access the cache memory 200. In step S702, the instruction execution unit (IEU) 23 generates a virtual address corresponding to the instruction. In step S703, the load/store unit (LSU) 22 generates a predicted cache index according the prediction bit and a part of a virtual page offset of the virtual address. In step S704, the LSU 22 uses the predicted cache index to read a physical tag and data from the cache memory 200. In step S705, the MMU 24 translates the virtual address to a physical address. It is noted that, the steps S704 and S705 can be performed in parallel. In step S706, it is determined whether a prediction verification operation succeeds. If the prediction verification operation succeeds, in steps S707, it is determined whether a tag verification operation succeeds. If the prediction verification operation does not succeed (i.e., fails), in step S708, a prediction miss handling is performed. For example, the LSU 22 may use the "actual" cache index obtained from the physical address generated by the MMU 24 to access the cache memory 200 again and transmits the read data to the CPU. If the tag verification operation does not succeed (i.e., fails), in step S709, a cache miss handling is performed. For example, the CPU may issue a request to a next-level memory hierarchy for requesting the desired data which cannot be read from the cache memory 200. If the tag verification operation succeeds, the read data from the cache memory 200 is transmitted to the CPU. However, more operations, such as updating one or more tables (e.g., the shadow register list, the reference prediction table or the history table) can be performed in step S708 and/or S709.

Figure 8:
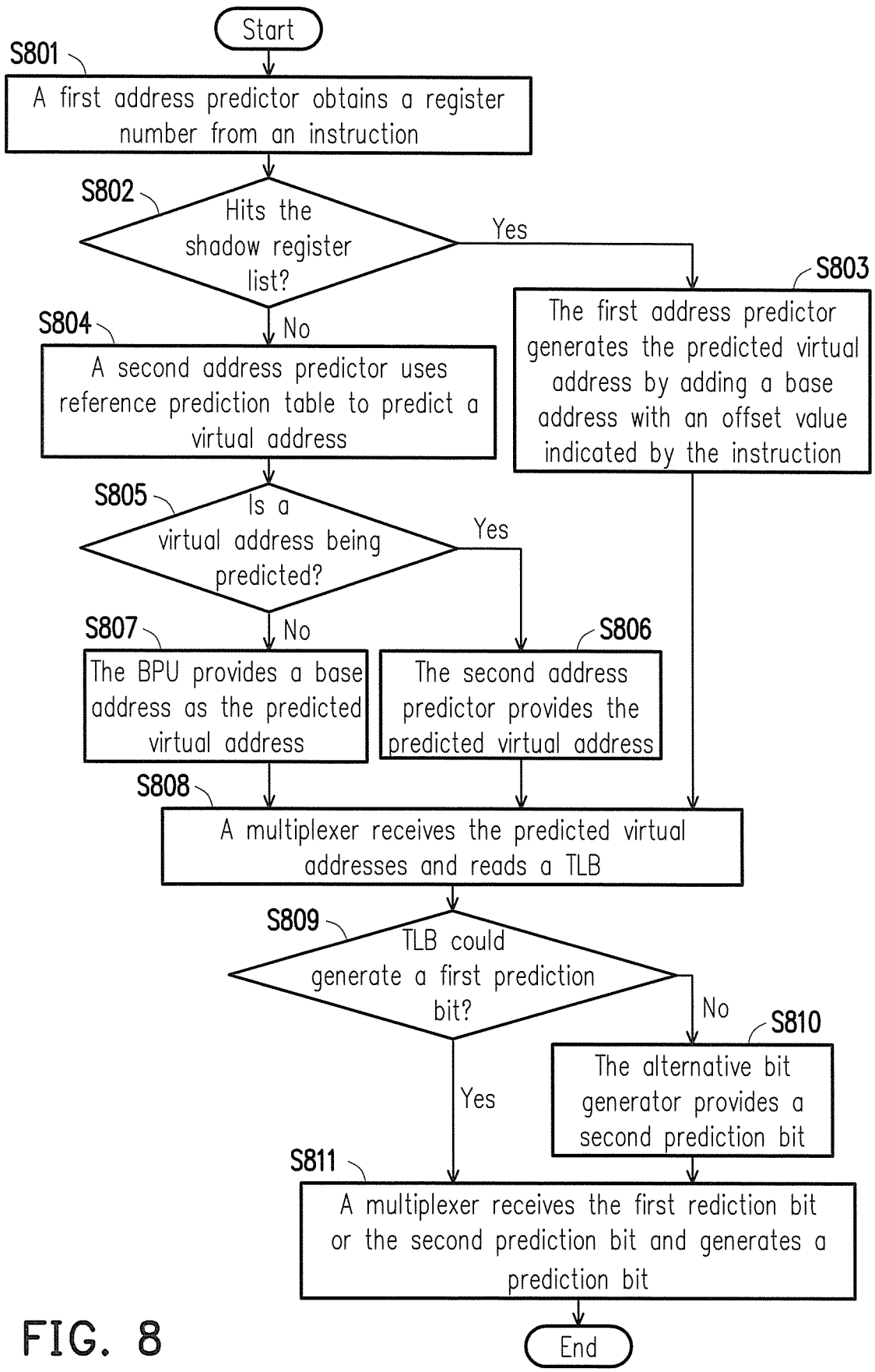
FIG. 8 is a flowchart of a method for accessing a cache memory according to another embodiment of the disclosure.

FIG. 8 is a flowchart of a method for accessing a cache memory according to another embodiment of the disclosure.

Referring to FIG. 2 and FIG. 8, in step S801, a first address predictor (e.g., the address predictor 211) obtains a register number from an instruction. In step S802, it is determined whether the register number hits a shadow register list. If the register number hits the shadow register list, in step S803, the first address predictor generates the predicted virtual address by adding a base address with an offset value indicated by the instruction. If the register number does not hit the shadow register list, in step S804, a second address predictor (e.g., the address predictor 212) tries to use a reference prediction table to predict a virtual address. In step S805, it is determined whether a virtual address is predicted by the second address predictor. If the virtual address is predicted in steps S804, then in step S806, the second address predictor provides the predicted virtual address. If the virtual address is not predicted in steps S804, then in step S807, the BPU 21 serves a base address of a base register 202 as the predicted virtual address. In step S808, a multiplexer 213 receives the predicted virtual address and accordingly reads the TLB 201 by using the predicted virtual address. In step S809, it is determined whether the TLB 201 could generate a first prediction bit. If the first prediction bit is not generated by the TLB 201, in step S810, an alternative bit generator 215 provides a second prediction bit. In step S811, a multiplexer 214 receives the first prediction bit or the second prediction bit and accordingly generates a prediction bit.

Figure 1B:
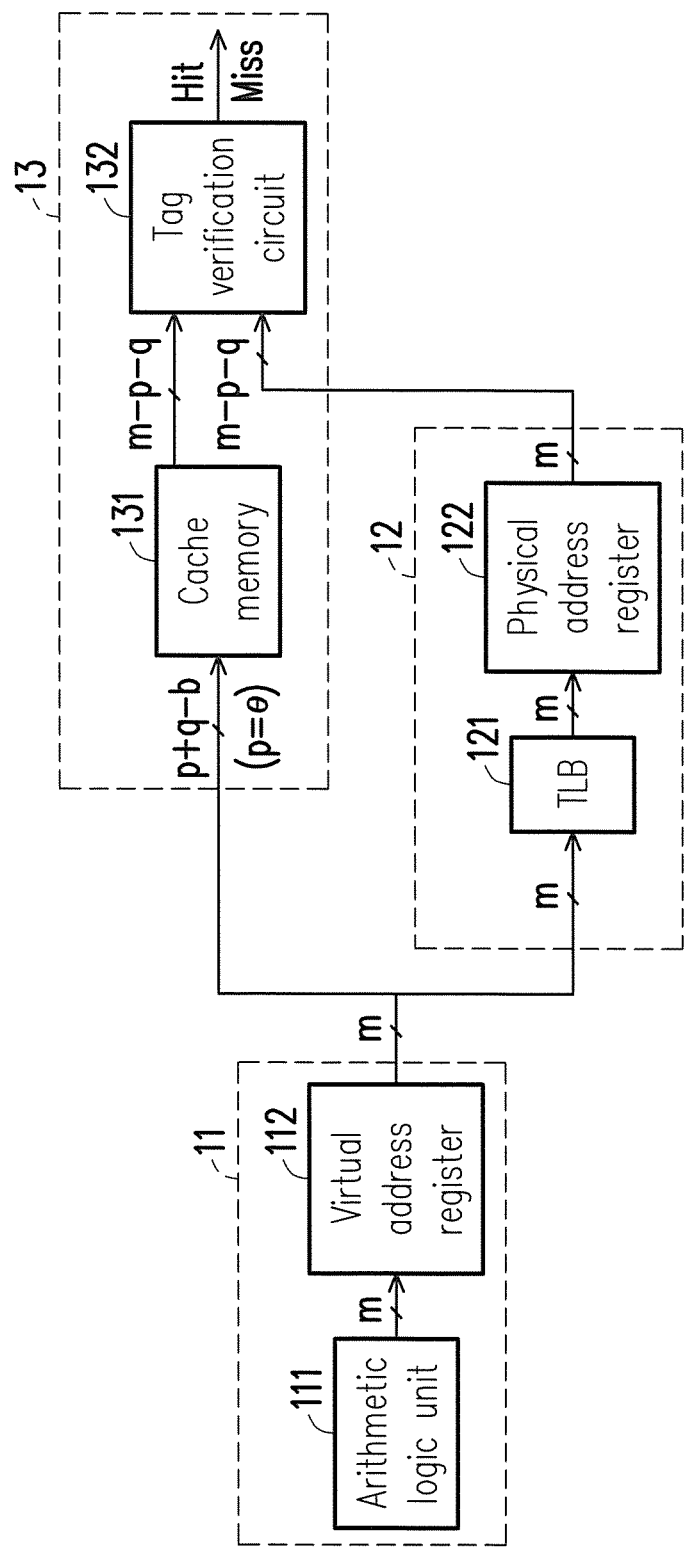
FIG. 1B is a modified cache accessing structure for a CPU.

Nevertheless, steps depicted in FIG. 1 and FIG. 8 are described in detail as above so that related description thereof is omitted hereinafter. It should be noted that, the steps depicted in FIG. 7 and FIG. 8 may be implemented as a plurality of program codes or circuits, which are not particularly limited in the disclosure. Moreover, the method disclosed in FIG. 7 and FIG. 8 may be implemented by reference with above exemplary embodiments, or may be implemented separately, which are not particularly limited in the disclosure.

To sum up, after an instruction instructing to access a cache memory is received from a CPU, a virtual address and one or more prediction bits corresponding to the instruction are generated. For example, three ways can be used for providing the predicted virtual address and thereby generating a first prediction bit which may be served as the prediction bit. Furthermore, if a TLB miss event occurs so the first prediction bit is not obtained, a second prediction bit can be provided by an alternative bit generator and be alternatively served as the prediction bit. Then, a predicted cache index is generated according to the prediction bit and a part of a virtual page offset of the virtual address and is further used for reading data from the cache memory. Therefore, the maximum size of the cache memory could be increased.

Although the disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:

1. A method for accessing a cache memory, comprising:
generating, by a bit prediction unit (BPU), a prediction bit corresponding to an instruction instructing to access the cache memory from a central processing unit (CPU);
generating, by an instruction execution unit (IEU), a virtual address corresponding to the instruction, wherein the prediction bit is not obtained from the virtual address;
generating, by a load/store unit (LSU), a predicted cache index by combining the prediction bit and a part of a virtual page offset of the virtual address; and
reading, by the LSU, data from the cache memory by using the predicted cache index.

2. The method as recited in claim 1, further comprising:
reading, by the LSU, a physical tag from the cache memory by using the predicted cache index;
translating, by a memory management unit (MMU), the virtual address to a physical address;
determining, by the LSU, whether the prediction bit is identical to a specific bit of the physical address;
determining, by the LSU, whether the physical tag is identical to a specific tag in the physical address; and
transmitting, by the LSU, the data read from the cache memory to the CPU if the prediction bit is identical to the specific bit of the physical address and the physical tag is identical to the specific tag of the physical address.

3. The method as recited in claim 2, wherein the step of generating, by the BPU, the prediction bit corresponding to the instruction instructing to access the cache memory from the CPU comprises:
generating a predicted virtual address corresponding to the instruction;
reading a translation lookaside buffer (TLB) according to the predicted virtual address;
determining whether a first prediction bit is obtained by reading the TLB;
providing a second prediction bit by an alternative bit generator if the first prediction bit is not obtained by reading the TLB; and
generating the prediction bit according to one of the first prediction bit and the second prediction bit.

4. The method as recited in claim 3, wherein the step of generating the predicted virtual address corresponding to the instruction comprises:
obtaining a register number from the instruction; and
providing a base address of a base register corresponding to the register number as the predicted virtual address.

5. The method as recited in claim 3, wherein the step of generating the predicted virtual address corresponding to the instruction comprises:
obtaining a register number from the instruction;
determining whether the register number hits a shadow register list; and
generating the predicted virtual address by adding a base address corresponding to the register number with an offset value indicated by the instruction if the register number hits the shadow register list.

6. The method as recited in claim 5, wherein the step of generating the predicted virtual address corresponding to the instruction further comprises:
reading a reference prediction table by using at least one bit of a program counter corresponding to the instruction if the register number does not hit the shadow register list;
obtaining the predicted virtual address by adding a stride value to a virtual address corresponding to the program counter if the virtual address corresponding to the program counter and the stride value are obtained from the reference prediction table; and
obtaining the predicted virtual address from a base register corresponding to the register number if the virtual address corresponding to the program counter and the stride value are not obtained from the reference prediction table.

7. The method as recited in claim 3, wherein the step of providing the second prediction bit by the alternative bit generator comprises:
providing an alternative bit as the second prediction bit, wherein the alternative bit is a bit having a constant value or a bit used as a prediction bit from a previous load/store instruction.

8. The method as recited in claim 3, wherein the step of providing the second prediction bit by the alternative bit generator comprises:
providing an alternative bit as the second prediction bit through reading a history table by using a history table index corresponding to the instruction.

9. The method as recited in claim 8, further comprising:
updating the history table according to a physical address generated by the MMU corresponding to the virtual address if the first prediction bit is not obtained by reading the TLB.

10. The method as recited in claim 9, wherein the step of updating the history table comprises:
performing a logical operation on a base address corresponding to the instruction and an offset value indicated by the instruction to generate the history table index; and
recording a mapping relationship between the history table index and a specific bit in the physical bit into the history table.

11. A device for accessing a cache memory, comprising:
a bit prediction unit (BPU), configured to generate a prediction bit corresponding to an instruction instructing to access the cache memory from a central processing unit (CPU);
an instruction execution unit (IEU), coupled to the BPU and configured to generate a virtual address corresponding to the instruction, wherein the prediction bit is not obtained from the virtual address;
a load/store unit (LSU), coupled to the BPU and configured to generate a predicted cache index by combining the prediction bit and a part of a virtual page offset of the virtual address,
wherein the LSU is further configured to read data from the cache memory by using the predicted cache index.

12. The device as recited in claim 11, further comprising:
a memory management unit (MMU), coupled to the IEU and the LSU and configured to translate the virtual address to a physical address,
wherein the LSU is further configured to read a physical tag from the cache memory by using the predicted cache index,
wherein the LSU is further configured to determine whether the prediction bit is identical to a specific bit in the physical address,
wherein the LSU is further configured to determine whether the physical tag is identical to a specific tag in the physical address,
wherein the LSU is further configured to transmit the data read from the cache memory to the CPU if the prediction bit is identical to the specific bit of the physical address and the physical tag is identical to the specific tag in the physical address.

13. The device as recited in claim 12, wherein the operation of generating the prediction bit corresponding to the instruction instructing to access the cache memory from the CPU by the BPU comprises:
generating a predicted virtual address corresponding to the instruction;
reading a translation lookaside buffer (TLB) according to the predicted virtual address;
determining whether a first prediction bit is obtained by reading the TLB;
providing a second prediction bit by an alternative bit generator if the first prediction bit is not obtained by reading the TLB; and
generating the prediction bit according to one of the first prediction bit and the second prediction bit.

14. The device as recited in claim 13, wherein the BPU is further configured to obtain a register number from the instruction and provide a base register corresponding to the register number as the predicted virtual address.

15. The device as recited in claim 13, wherein the BPU comprises a first address predictor,
wherein the first address predictor is configured to obtain a register number from the instruction,
wherein the first address predictor is further configured to determine whether the register number hits a shadow register list,
wherein the first address predictor is further configured to generate the predicted virtual address by adding a base address corresponding to the register number with an offset value indicated by the instruction if the register number hits the shadow register list.

16. The device as recited in claim 15, wherein the BPU further comprises a second address predictor,
wherein the second address predictor is configured to read a reference prediction table by using at least one bit of a program counter corresponding to the instruction if the register number does not hit the shadow register list,
wherein the second address predictor is further configured to obtain the predicted virtual address by adding a stride value to a virtual address corresponding to the program counter if the virtual address corresponding to the program counter and the stride value are obtained from the reference prediction table,
wherein the BPU is further configured to obtain the predicted virtual address from a base register corresponding to the register number if the virtual address corresponding to the program counter and the stride value are not obtained from the reference prediction table.

17. The device as recited in claim 13, wherein the operation of providing the second prediction bit by the alternative bit generator comprises:
providing an alternative bit as the second prediction bit, wherein the alternative bit is a bit having a constant value or a bit used as a prediction bit from a previous load/store instruction.

18. The device as recited in claim 13, wherein the operation of providing the second prediction bit by the alternative bit generator comprises:
providing an alternative bit as the second prediction bit through reading a history table by using a history table index corresponding to the instruction.

19. The device as recited in claim 18, wherein the alternative bit generator is further configured to update the history table according to a physical address generated by the MMU corresponding to the virtual address if the first prediction bit is not obtained by reading the TLB.

20. The device as recited in claim 19, wherein the alternative bit generator comprises a logical circuit,
wherein the logical circuit is configured to perform a logical operation on a base address corresponding to the instruction and an offset value indicated by the instruction to generate the history table index,
wherein the alternative bit generator is further configured to record a mapping relationship between the history table index and a specific bit in the physical address into the history table.

* * * * *